US007016656B2

(12) United States Patent
Odashima et al.

(10) Patent No.: US 7,016,656 B2
(45) Date of Patent: Mar. 21, 2006

(54) WIRELESS TERMINAL FOR MOBILE UNIT

(75) Inventors: Masahiro Odashima, Saitama (JP); Tadamasa Yamanaka, Saitama (JP); Koji Sakuma, Saitama (JP)

(73) Assignee: Pioneer Corporation, Tokyo (JP)

( * ) Notice: Subject to any disclaimer, the term of this patent is extended or adjusted under 35 U.S.C. 154(b) by 493 days.

(21) Appl. No.: 09/821,082

(22) Filed: Mar. 30, 2001

(65) Prior Publication Data
US 2002/0022489 A1   Feb. 21, 2002

(30) Foreign Application Priority Data
Mar. 30, 2000 (JP) ............... P.2000-095905

(51) Int. Cl.
H04B 1/40 (2006.01)
H04M 11/04 (2006.01)
H04M 11/00 (2006.01)
H04M 1/66 (2006.01)
H04M 1/68 (2006.01)

(52) U.S. Cl. ............... 455/74.1; 455/404.1; 455/404.2; 455/407; 455/410; 455/565; 455/572

(58) Field of Classification Search ............... 455/456, 455/407, 74.1, 410, 565, 404.2, 572, 404.1
See application file for complete search history.

(56) References Cited

U.S. PATENT DOCUMENTS 5,461,664 A * 10/1995 Cappadona ................. 455/572
5,742,666 A * 4/1998 Alpert ...................... 455/404.2
5,815,807 A * 9/1998 Osmani et al. ............. 455/410
5,845,218 A * 12/1998 Altschul .................... 455/565
5,875,393 A * 2/1999 Altschul et al. ............ 455/407
5,966,643 A * 10/1999 Radley ...................... 455/74.1
6,112,077 A * 8/2000 Spitaletta et al. ........... 455/407
6,115,597 A * 9/2000 Kroll et al. ................ 455/404.1
6,332,074 B1* 12/2001 Spitaletta et al. ........... 455/407

FOREIGN PATENT DOCUMENTS

| DE | 198 17 962 A1 | 10/1999 |
| EP | 0 737 953 A1 | 10/1996 |
| WO | 98/06229 | 2/1998 |

* cited by examiner

Primary Examiner—William D. Cumming
(74) Attorney, Agent, or Firm—Sughrue Mion, PLLC

(57) ABSTRACT

Only an information output from a wireless terminal for mobile unit to a wireless base station is allowed in response to an operation of operating means of the wireless terminal for mobile unit. When only the information output from the wireless terminal for mobile unit to the wireless base station has been allowed by the operation of the operating means, an information output from the wireless base station to the wireless terminal for mobile unit is allowed in response to another operation of the operating means. The wireless terminal for mobile unit is constructed so as not to respond to another operation of the operating means during the predetermined time since the first operation of the operating means.

5 Claims, 3 Drawing Sheets

WIRELESS TERMINAL FOR MOBILE UNIT

BACKGROUND OF THE INVENTION

1. Field of the Invention

The present invention relates to a wireless terminal for mobile unit, and particularly to a wireless terminal for mobile unit capable of conducting information communications with a center (wireless base station) in the event of an emergency such as an accident.

2. Description of the Related Art

Conventionally, an emergency communication system capable of informing a remote center of a scene state through wireless in the event of an emergency such as a vehicle accident of a car has been known.

According to this system, the center can know the present position (latitude, longitude) of the car sequentially through wireless contact from a wireless terminal for mobile unit connected to a navigation system of the car. Also, in the event of the emergency of the car, intercommunication with the center can be conducted by accessing the center through wireless from the wireless terminal for mobile unit placed in the car, and a passenger of the car can explain a state of the scene through the wireless in response to an inquiry from the center. The center can grasp the contents of the emergency based on the present position of the car and the state of the scene received, and report the contents to a police station, a fire station, a hospital, etc. to meet the contents of the emergency without delay.

However, in case that a passenger of the car encounters with a robber, depending on circumstances, emergency wireless contact from the center to the wireless terminal for mobile unit may had better not be made at once. This is because the robber may often do harm to the passenger quickly in an attempt to interfere with the report of the contents of the emergency to the center in case where the robber gathers from an inquiry from the center that the passenger of the car accessed the center from the wireless terminal for mobile unit.

SUMMARY OF THE INVENTION

The invention is implemented in view of the problem described above, and an object of the invention is to provide a wireless terminal for mobile unit in which only an information output to a wireless base station by voice or image is allowed according to the contents of an emergency in case of the emergency.

To achieve the above object, according to a first aspect of the invention, there is provided a wireless terminal for mobile unit for being mounted in a mobile unit and conducting communications with a wireless base station through wireless, and is characterized in that there is provided operating means for starting the communications with the wireless base station and only an information output from the wireless terminal for mobile unit to the wireless base station is allowed in response to the fact that the operating means has been operated.

According to an illustrative, non-limiting embodiment of the invention, the wireless terminal for mobile unit starts the communications with the wireless base station by operating the operating means and only an information output from the wireless terminal for mobile unit to the wireless base station is allowed, so that the wireless base station can sequentially grasp the present circumstances of the side of the wireless terminal for mobile unit by the outputted information and therefore can take the subsequent measures properly and speedily according to the circumstances.

Also, according to a second aspect of the invention, in a wireless terminal for mobile unit as set forth in the first aspect, when only the information output from the wireless terminal for mobile unit to the wireless base station has been allowed in response to the fact that the operating means has been operated, an information output from the wireless base station is allowed in response to the fact that the operating means has again been operated.

According to the second aspect of the invention, a user of the wireless terminal for mobile unit again operates the operating means according to the circumstances, and an information output from the wireless base station is allowed, with the result that the wireless terminal for mobile unit and the center can mutually output information. Thus, the wireless base station can grasp the present circumstances of the side of the wireless terminal for mobile unit and can take the subsequent measures properly and speedily according to the circumstances. Also, the wireless base station can inform the user of the wireless terminal for mobile unit of information necessary for avoidance of danger.

Also, according to a third aspect of the invention, in a wireless terminal for mobile unit as set forth in the first aspect, when only the information output from the wireless terminal for mobile unit to the wireless base station has been allowed in response to the fact that the operating means has been operated, an information output from the wireless base station is allowed in response to the fact that the operating means has again been operated after a lapse of predetermined time since the first operation.

According to the third aspect of the invention, the wireless terminal for mobile unit does not respond to another operation of the operating means during the predetermined time since the first operation of the operating means, so that an information output from the wireless base station can be prevented from being allowed even if a user of the wireless terminal for mobile unit hastily operates the operating means again and again as long as there is a range within the predetermined time since the first operation of the operating means, for example, when only the information output from the wireless terminal for mobile unit to the wireless base station has been allowed in a state of emergency.

Also, according to a fourth aspect of the invention, in a wireless terminal for mobile unit as set forth in the first aspect, when only the information output from the wireless terminal for mobile unit to the wireless base station has been allowed in response to the fact that the operating means has been operated, a voice information output from the wireless base station is allowed in response to a voice output request message sent from the wireless base station.

According to the fourth aspect of the invention, when only the information output from the wireless terminal for mobile unit to the wireless base station has been allowed in response to the fact that the operating means has been operated, in case that the wireless base station must send voice information to the wireless terminal for mobile unit according to the present circumstances of the side of the wireless terminal for mobile unit obtained by an information output from the wireless terminal for mobile unit, the wireless base station sends a voice output request message and the wireless terminal for mobile unit receives this message, and a voice information output from the wireless base station is allowed, so that a user of the wireless terminal for mobile unit can avoid a state of danger by the voice information from the wireless base station according to the circumstances.

Also, according to a fifth aspect of the invention, in a wireless terminal for mobile unit as set forth in the first aspect, when only the information output from the wireless terminal for mobile unit to the wireless base station has been allowed in response to the fact that the operating means has been operated, an image information output from the wireless base station is allowed in response to an image output request message sent from the wireless base station.

According to the fifth aspect of the invention, when only the information output from the wireless terminal for mobile unit to the wireless base station has been allowed in response to the fact that the operating means has been operated, in case that the wireless base station must send image information to the wireless terminal for mobile unit according to the present circumstances of the side of the wireless terminal for mobile unit obtained by an information output from the wireless terminal for mobile unit, the wireless base station sends an image output request message and the wireless terminal for mobile unit receives this message, and an image information output from the wireless base station is allowed, so that a user of the wireless terminal for mobile unit can avoid a state of danger by the image information from the wireless base station according to the circumstances.

DETAILED DESCRIPTION OF THE PREFERRED EMBODIMENTS

Next, a preferable embodiment of the invention will be described with reference to the accompanying drawings.

Figure 1:
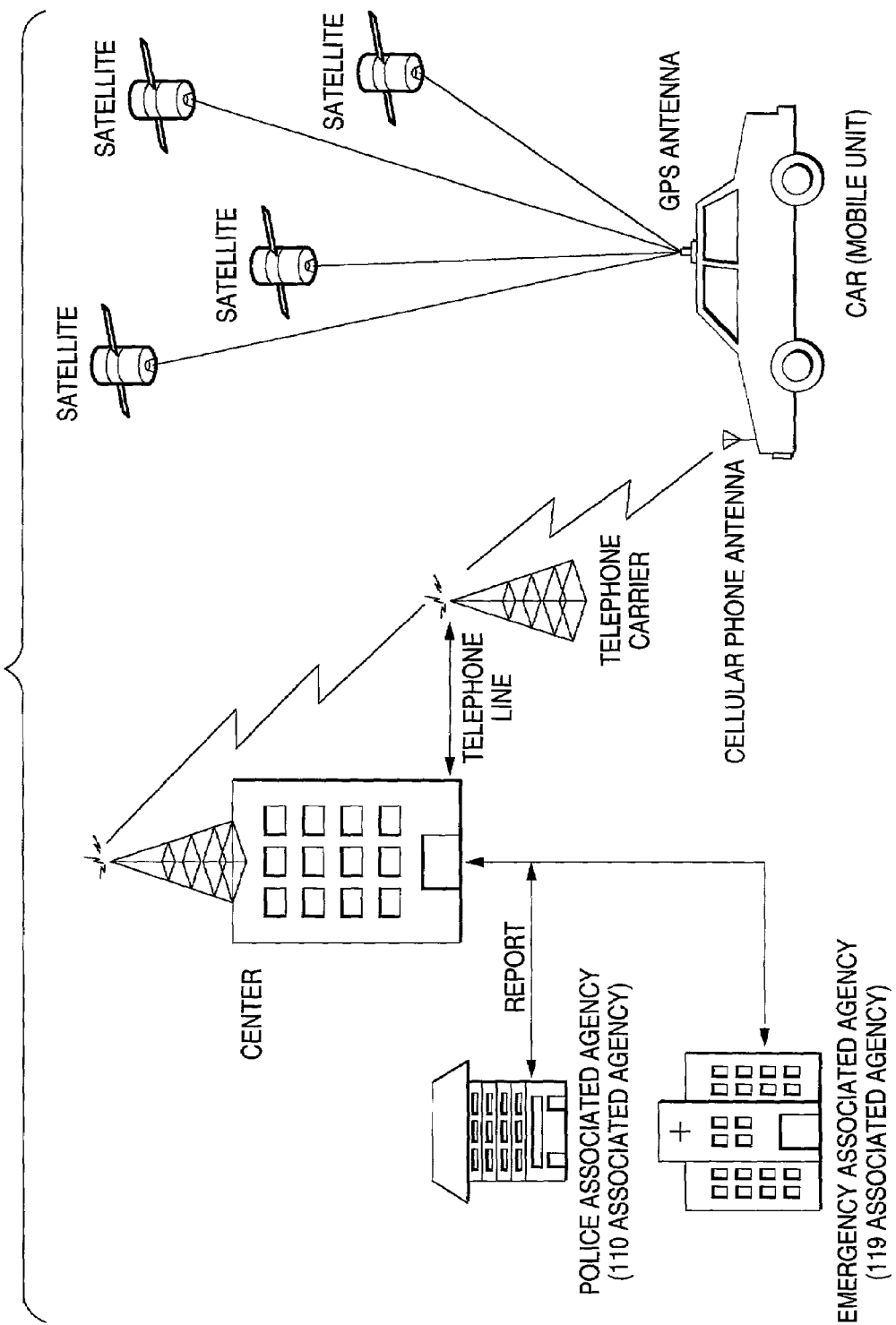
FIG. 1 is a conceptual diagram showing an emergency report system using a wireless terminal for mobile unit according to the invention.
Figure 2:
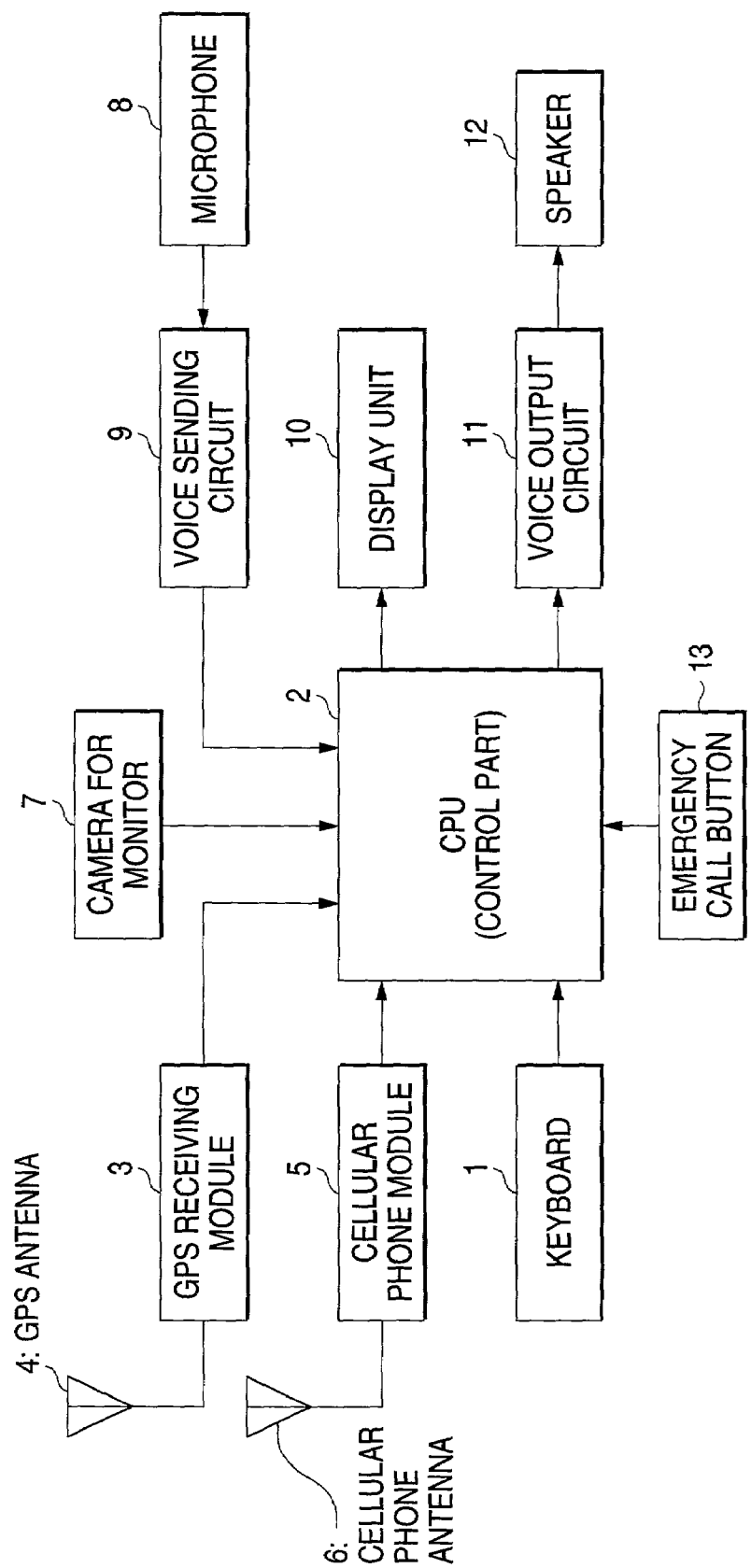
FIG. 2 is a schematic block diagram of the wireless terminal for mobile unit in a preferable embodiment of the invention.

FIG. 1 is a conceptual diagram showing an emergency report system using a wireless terminal for mobile unit according to the invention. Also, FIG. 2 is a schematic block diagram of the wireless terminal for mobile unit in the preferable embodiment of the invention. Here, a description will be made below assuming that the wireless terminal for mobile unit is mounted in a car acting as a mobile unit.

In the emergency report system in FIG. 1, a passenger of the car connects a telephone line of the wireless terminal for mobile unit to a telephone carrier nearby through wireless and line connection is made to a center (a wireless base station) connected to the telephone carrier through a wire or wireless telephone line.

The wireless terminal for mobile unit can receive radio waves sent from each satellite and sequentially calculate information about the present position (latitude, longitude) of the car based on the received radio waves, and can send this information along with identification information about my car to the center through the wireless.

Also, the passenger of the car can send voice information or image information that indicates situations of the inside of the car or the surroundings of the car to the center side by properly operating the wireless terminal for mobile unit.

Therefore, the center can sequentially know the present position of the car by the identification information and the present position information about the car obtained during the line connection to the wireless terminal for mobile unit.

Also, the center can know the situations of the inside of the car or the surroundings of the car by the voice information or image information obtained.

Also, the center is connected to police associated agencies or emergency associated agencies through a telephone line, and information by voice information or image information reported from these agencies can be sequentially sent to wireless terminals for mobile unit of each car through the telephone line while being able to interchange information between the center and these agencies as necessary.

Therefore, during the line connection between the wireless terminal for mobile unit and the center, a passenger of the car operates the wireless terminal for mobile unit as necessary and the voice information or image information from the center including the information from the police associated agencies or emergency associated agencies can be obtained, with the result that the passenger can avoid danger during travel of the car with reference to these information and as a result, can travel the car safely.

Therefore, for example, in case that a car encounters with the case of emergencies such as an accident or a trouble, a passenger of the car calls the center from the wireless terminal for mobile unit to inform the center side that my car is in a state of emergency and the center can obtain information by voice information or image information sent from the wireless terminal for mobile unit of each the car to provide an emergency report along with the identification information and the present position information of the car to each the agency described above, so that the center, the police associated agencies and the emergency associated agencies can speedily take proper measures against the contents of the emergency such as the accident or the trouble.

In the embodiment, there are a telephone call method by a normal mode described below and a telephone call method by a secret mode described below as a method in which a passenger of the car calls the center from the wireless terminal for mobile unit in an emergency and makes line connection and informs the center side of a state of emergency of my car by a telephone call.

In the telephone call method by the normal mode, the center and the wireless terminal for mobile unit can mutually deliver voice information and image information. Also, in the telephone call method by the secret mode, an information output from the center to the wireless terminal for mobile unit by the voice information and image information is not allowed and thus, situations of the inside of the car or the surroundings of the car can be known from the center side, but information from the center side cannot be obtained by voice and image from the side of the car in which the wireless terminal for mobile unit is mounted.

Therefore, a passenger of the car selects the telephone call methods by these modes according to the contents of the encountered accident or trouble, whereby it can be allowed or prohibited that the voice information or image information about the center side is outputted to the side of the wireless terminal for mobile unit. As a result of this, a state of danger expected in the case that the voice information or image information from the center side is outputted to the wireless terminal for mobile unit as necessary can be avoided, or the information about the center side can positively be outputted to the side of the wireless terminal for mobile unit.

Next, each part of a wireless terminal for mobile unit will be described.

In FIG. 2, the wireless terminal for mobile unit comprises a keyboard 1 for controlling each the part of the wireless terminal for mobile unit, a control part (CPU) 2, a GPS receiving module 3, a GPS antenna 4, a cellular phone module 5, a cellular phone antenna 6, a camera 7 for monitor, a microphone 8, a voice sending circuit 9, a display unit 10, a voice output circuit 11, a speaker 12, and an emergency call button 13.

The keyboard 1 has operating buttons for performing various operations of the wireless terminal for mobile unit and, for example, is provided on an operating panel of the wireless terminal for mobile unit, and commands corresponding to the various operations are sent to the control part 2 by an operation of a passenger. The control part 2 controls each the part of the wireless terminal for mobile unit by the commands from the keyboard 1.

Incidentally, in the embodiment, the keyboard 1 is provided with a center call button acting as operating means by a normal mode for making line connection between the wireless terminal for mobile unit and the center to make a telephone call to the center in the normal mode, and the passenger pushes this center call button (ON), and a center call command is issued to the control part 2. In the control part 2, it is controlled so that according to the command, line connection between the cellular phone module 5 and the center can be made to make a telephone call to the center in the normal mode.

Also, the GPS receiving module 3 receives radio waves sent from each satellite by the GPS antenna 4 and decodes various information signals from the satellites carried on these radio waves and generates data of the present position (latitude, longitude) of my car based on the various information signals to supply the data to the control part 2.

The control part 2 sequentially supplies this data of the present position of my car along with identification data of my car to the cellular phone module 5 based on the command from the keyboard 1. By control of the control part 2, the cellular phone module 5 generates a sending signal including present position information by the present position data and identification information by the identification data of my car supplied and sends the signal through wireless by the cellular phone antenna 6. As a result of that, the center can sequentially know the present position of the car while identifying the car from other cars by receiving this sending signal.

Also, the camera 7 for monitor is a camera for sequentially monitoring situations of the inside of the car or the surroundings of the car, and image data of the inside of the car or the surroundings of the car obtained by image pickup is sequentially supplied to the control part 2.

The control part 2 supplies this image data to the cellular phone module 5 based on the command from the keyboard 1. By control of the control part 2, the cellular phone module 5 generates a sending signal based on the supplied image data and sends the signal through wireless by the cellular phone antenna 6. As a result of that, the center can obtain image information from the car by receiving this sending signal, and the situations of the inside of the car or the surroundings of the car can be pictured on a display unit of the center side by the image information to be checked by the picture.

Also, the microphone 8 collects voice of the inside of the car and the surroundings of the car to generate a voice signal and supplies the signal to the voice sending circuit 9. The voice sending circuit 9 generates voice data based on the supplied voice signal to supply this data to the control part 2.

The control part 2 supplies this voice data to the cellular phone module 5 based on the command from the keyboard 1. By control of the control part 2, the cellular phone module 5 generates a sending signal based on the supplied voice data and sends the signal through wireless by the cellular phone antenna 6. As a result of that, the center can obtain voice information from the car by receiving this sending signal and by the voice information, the situations of the inside of the car or the surroundings of the car can be checked by voice through a voice reproducing unit of the center side.

Also, it is controlled so that the control part 2 receives a signal sent by wireless from the center side based on the command from the keyboard 1 by the cellular phone module 5 through the cellular phone antenna 6 to generate image data based on the received signal and this data is supplied to the display unit 10. The display unit 10 displays images such as characters or pictures based on image information of the center side by the supplied image data.

Also, it is controlled so that the control part 2 receives a signal sent by wireless from the center side by the cellular phone module 5 through the cellular phone antenna 6 to generate voice data based on the received signal and this data is supplied to the voice output circuit 11. In the voice output circuit 11, a voice signal is generated by the supplied voice data to supply the signal to the speaker 12. The speaker 12 issues voice based on voice information of the center side by the supplied voice signal.

Also, the emergency call button 13 is a center call button acting as operating means in which a passenger of the car makes line connection between the wireless terminal for mobile unit and the center to make a telephone call to the center in a secret mode, and the passenger pushes the emergency call button 13 (ON), and an emergency call command is issued to the control part 2. It is controlled so that the control part 2 can make line connection between the cellular phone module 5 and the center to make a telephone call to the center in the secret mode according to the command. Also, the secret mode is released by again pushing the emergency call button 13 after predetermined time t described below since the issue of the emergency call command by the first push of the emergency call button 13.

Incidentally, the passenger must make line connection between the wireless terminal for mobile unit and the center so as not to be found by a robber, so that the emergency call button 13 is desirably placed in a car's portion in which a button operation is not conspicuous, and here, the button 13 is placed in a door portion of a driver's seat of the car.

Next, control operations in which the control part 2 controls each the part based on a center call command by the center call button in the normal mode or the emergency call button 13 will be described using FIG. 3.

Figure 3:
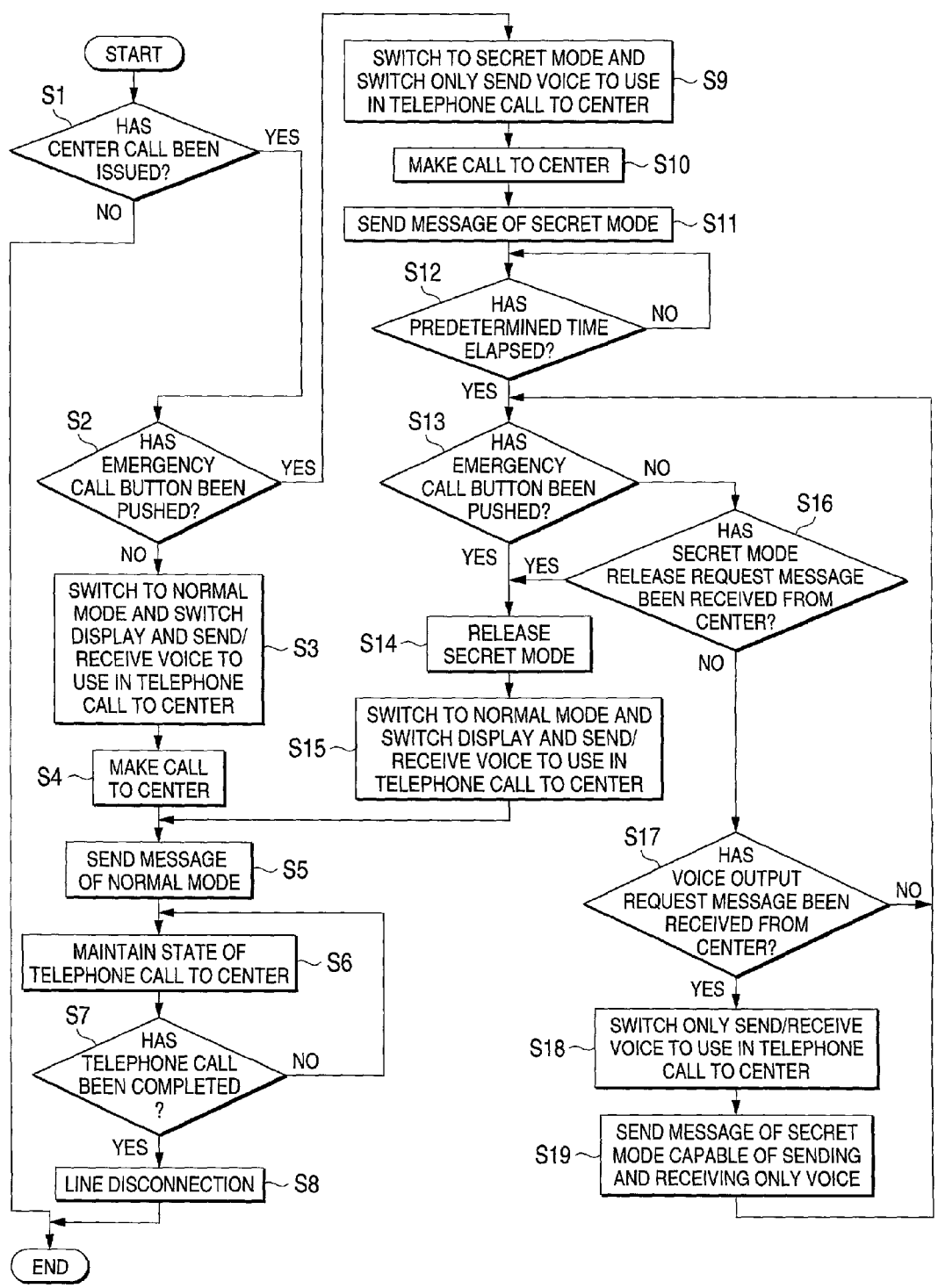
FIG. 3 is a diagram showing a control operational flowchart of a control part based on a center call command.

FIG. 3 is a diagram showing a control operational flowchart of the control part 2 based on the center call command.

In FIG. 3, when the power of a wireless terminal for mobile unit is turned on, the control part 2 first proceeds to step S1 and determines whether a center call has been issued or not. In step S1, the control part 2 detects whether either a call button by the normal mode of a cabinet 1 or the emergency call button 13 has been pushed (ON) or not, and if either button has not been pushed, it is determined that the center call command has not been issued, and the control operations are ended. Also, in step S1, if it is detected that either the call button by the normal mode of the cabinet 1 or the emergency call button 13 has been pushed (ON), it is determined that the center call command has been issued, and the control part 2 proceeds to step S2.

In step S2, the control part 2 determines whether the emergency call button 13 has been pushed or not, and if the emergency call button 13 has not been pushed, namely, if it is determined that the center call command has been issued by pushing the call button by the normal mode, the control part 2 proceeds to step S3 and it is controlled so that line connection between the cellular phone module 5 and the center can be made to make a telephone call to the center in the normal mode. Thus, the camera 7 for monitor, the display unit 10, the microphone 8, the voice sending circuit 9, the voice output circuit 11 and the speaker 12 are switched to use in the telephone call by the normal mode to the center, respectively. As a result of that, voice information and image information can be sent and received mutually between the wireless terminal for mobile unit and the center.

Next, the control part 2 proceeds to step S4 and after making a call to the center, the control part 2 proceeds to step S5 and sends a message for informing the center that the wireless terminal for mobile unit is presently in the normal mode, and subsequently proceeds to step S6.

The control part 2 proceeds to step S7 after maintaining a state of the telephone call by the normal mode to the center in step S6. In step S7, the control part 2 determines whether the telephone call to the center has been completed or not, for example, by sequentially detecting whether a telephone call completion button provided in the keyboard 1 has been pushed or not, and if the telephone call has not been completed, the control part 2 returns to the previous step S6 and again performs the subsequent operations of each the step.

Also, in step S7, if the control part 2 determines that the telephone call to the center has been completed, the control part 2 proceeds to step S8 and after disconnecting the line to the center, the operations of the flowchart are ended.

On the other hand, in step S2, if the control part 2 determines that the emergency call button 13 has been pushed, the control part 2 determines that an emergency call command has been issued, and proceeds to step S9. In step S9, it is controlled so that the control part 2 can make line connection between the cellular phone module 5 and the center to make a telephone call to the center in a secret mode. Thus, the camera 7 for monitor, the display unit 10, the microphone 8, the voice sending circuit 9, the voice output circuit 11 and the speaker 12 are switched to use in the telephone call by the secret mode to the center, respectively. As a result of that, image information about the inside of the car and the surroundings of the car can be sent from the wireless terminal for mobile unit to the center through the camera 7 for monitor, or voice information can be sent through the microphone 8, so that the center can monitor the side of the wireless terminal for mobile unit through the image information and the voice information. Incidentally, in step S9, the control part 2 starts to measure time t elapsed from the start of the emergency call command in addition to the control operations described above.

Also, even when voice information and image information about the center are sent from the center to the wireless terminal for mobile unit through the cellular phone module 5, it is controlled so that the control part 2 does not display the image of the center side based on the received image information by the display unit 10 or does not issue the voice of the center side based on the voice information from the speaker 12, so that from the wireless terminal for mobile unit, a passenger of the car cannot hear the voice by the voice information about the center or cannot view the image by the image information about the center.

Next, the control part 2 proceeds to step S10 and after making a call to the center, the control part 2 proceeds to step S11 and sends a message for informing the center that the wireless terminal for mobile unit is presently in the secret mode, and subsequently proceeds to step S12.

In step S12, the control part 2 detects whether or not predetermined time t has elapsed from the start of the emergency call command in step S9 described above, and if the predetermined time t has elapsed, the control part 2 proceeds to step S13.

This is because a passenger of the car may hastily push the emergency call button 13 again and again in an attempt to switch to a telephone call by the secret mode in a state of emergency and even in that case, the telephone call by the secret mode to the center can substantially be ensured without releasing the secret mode of the wireless terminal for mobile unit carelessly. Therefore, the control part 2 does not respond to the emergency call command during the operations of step S10 to step S12 even if several emergency call commands by a push of the emergency call button 13 are accepted.

In step S13, the control part 2 detects whether or not the emergency call button 13 has been pushed after a lapse of the predetermined time in the previous step S12, and if the emergency call button 13 has been pushed, the control part 2 proceeds to step S14, and proceeds to step S15 after releasing the secret mode in a state of the telephone call presently, and it is controlled so that a telephone call to the center in the normal mode can be made by the cellular phone module 5. Thus, a passenger of the car can switch the wireless terminal for mobile unit to the telephone call by the secret mode to the center by pushing the emergency call button 13 (step S2), and subsequently in the case of desiring the telephone call by the normal mode to the center under the present circumstances, the passenger can switch the wireless terminal to the normal mode by properly pushing the emergency call button 13 after a lapse of the predetermined time in step S12.

After the control operations of step S15, the control part 2 proceeds to the previous step S5 and performs the subsequent control operations in each the step.

On the other hand, if it is determined that emergency call button 13 has not been pushed in step S13, the control part 2 proceeds to step S16, and detects whether or not the cellular phone module 5 has received a message to the effect that release of the present secret mode is requested from the center, and if the message has been received from the center, the control part 2 proceeds to the previous step S14 and performs the subsequent operations of each the step. This is the control operation in which when the wireless terminal for mobile unit is in a state of the telephone call by the secret mode to the center in the previous step S9, the control part 2 responds in the case that the center sequentially recognizes situations of the inside of the car and the surroundings of the car by voice information and image information and determines that the side of the wireless terminal for mobile unit is in a state in which the voice information and the image information about the center side should be obtained (or may be obtained) and sends a message to the effect that it is requested so as to release the secret mode to the side of the wireless terminal for mobile unit and the wireless terminal for mobile unit receives this message.

Also, if the message to the effect that release of the present secret mode is requested has not been received from the center in step S16, the control part 2 proceeds to step S17 and determines whether or not a voice output request message has been received from the center. This voice output request message has been received from the center is the control operation in which when the wireless terminal for mobile unit is in a state of the telephone call by the secret mode to the center in the previous step S9, the control part 2 responds in the case that the center sequentially recognizes situations of the inside of the car and the surroundings of the car by voice information and image information and then determines that the side of the wireless terminal for mobile unit is in a state in which the voice information about the center side should be obtained (or may be obtained) and sends a message to the effect that an output of the voice information is allowed to the side of the wireless terminal for mobile unit and the wireless terminal for mobile unit receives this message.

Therefore, if the message to the effect that only an output of the voice information is allowed has not been received from the center in step S17, the control part 2 again proceeds to step S13 and performs the subsequent operations of each the step.

Also, if the message has been received from the center in step S17, the control part 2 proceeds to step S18, and it is controlled so that only the voice information is outputted from the center to the wireless terminal for mobile unit. As a result of that, in the wireless terminal for mobile unit, voice based on the voice information from the center can be heard from the speaker 12. Therefore, a passenger of the car can obtain the voice information from the center by the voice under the circumstances of the inside of the car and the surroundings of the car in which the center determines that an output of only the voice information is allowed, and can take the subsequent proper measures against the contents of the emergency with reference to the voice information.

Next, the control part 2 proceeds to step S19 and after sending a message to the effect that it is in the secret mode for allowing an output of only voice information of the information from the center, the control part 2 proceeds to step S13 and performs the subsequent operations of each the step. As a result of that, by receiving this message, the center side can recognize that the wireless terminal for mobile unit of the car in a state of emergency is in a state capable of making a telephone call by the secret mode for allowing an output of only voice information of the information from the center.

As described above, the control part 2 can make a telephone call by the normal mode to the center by pushing the center call button provided in the keyboard 1, and a passenger of the car can mutually output information such as voice information and image information to the center by the wireless terminal for mobile unit.

Also, the control part 2 can make a telephone call by the secret mode to the center by an operation of one push of the emergency call button 13 provided in a door, and only an information output from the wireless terminal for mobile unit to the center is allowed. As a result of that, circumstances of the side of the wireless terminal for mobile unit (that is, situations of the inside of the car and the surroundings of the car) can be reported from the passenger of the car to the center by voice information and image information, so that the center can sequentially know the situations of the inside of the car and the surroundings of the car by these information, and can take the subsequent measures properly and speedily according to the circumstances.

Also in the embodiment, in this case, the wireless terminal for mobile unit does not allow an output of information such as voice information or image information from the center, so that a state of danger expected in the case that the information such as voice information or image information from the center side is outputted to the wireless terminal for mobile unit can be avoided.

Also, in the control part 2, when the wireless terminal for mobile unit is switched to a telephone call by the secret mode by the operation of the emergency call button 13, in response to the fact that the emergency call button 13 has again been operated after a lapse of the predetermined time since the operation of the emergency call button 13, the secret mode is released and an output of information such as voice information or image information from the center is allowed and a telephone call by the normal mode to the center can be made. Thus, a passenger of the car can mutually output information such as voice information and image information to the center.

As a result of that, circumstances of the side of the wireless terminal for mobile unit (that is, situations of the inside of the car and the surroundings of the car) can be reported from the passenger of the car to the center by voice information and image information, so that the center can sequentially know the situations of the inside of the car and the surroundings of the car by these information, and can take the subsequent measures properly and speedily according to the circumstances. Also, by the information such as voice information or image information from the center, information necessary for avoidance of danger can be reported to the side of the wireless terminal for mobile unit.

Incidentally, in the emergency system in the embodiment described above, the voice information and image information have been used as information that is sent and received between the center and the wireless terminal for mobile unit, but the information outputted mutually may be information based on only the voice information or may be information based on only the image information.

Also, in the wireless terminal for mobile unit in the embodiment described above, it has been controlled so that the wireless terminal for mobile unit itself prohibits an output of information sent from the center when the output of information sent from the center is prohibited in the secret mode, but on the contrary, it may be controlled so that the center side receives a message indicating the secret mode outputted from the wireless terminal for mobile unit in the secret mode and itself prohibits information from being sent in response to this message. According to this, a malfunction of an operator of the center side can be prevented.

As described above, according to the first aspect of the invention, the wireless terminal for mobile unit starts the communications with the wireless base station by operating the operating means and only an information output from the wireless terminal for mobile unit to the wireless base station is allowed, so that the wireless base station can sequentially grasp the present circumstances of the side of the wireless terminal for mobile unit by the outputted information and therefore can take the subsequent measures properly and speedily according to the circumstances.

Also, according to the second aspect of the invention, a user of the wireless terminal for mobile unit again operates the operating means according to the circumstances whereby an information output from the wireless base station is allowed, with the result that the wireless terminal for mobile unit and the center can mutually output information. Thus, the wireless base station can grasp the present circumstances of the side of the wireless terminal for mobile unit and can take the subsequent measures properly and speedily according to the circumstances. Also, the wireless base station can inform the user of the wireless terminal for mobile unit of information necessary for avoidance of danger.

Also, according to the third aspect of the invention, the wireless terminal for mobile unit does not respond to another operation of the operating means during the predetermined time since the first operation of the operating means, so that an information output from the wireless base station can be prevented from being allowed even if a user of the wireless terminal for mobile unit hastily operates the operating means again and again as long as there is a range within the predetermined time since the first operation of the operating means, for example, when only the information output from the wireless terminal for mobile unit to the wireless base station has been allowed in a state of emergency.

Also, according to the fourth aspect of the invention, when only the information output from the wireless terminal for mobile unit to the wireless base station has been allowed in response to the fact that the operating means has been operated, in case that the wireless base station must send voice information to the wireless terminal for mobile unit according to the present circumstances of the side of the wireless terminal for mobile unit obtained by an information output from the wireless terminal for mobile unit, the wireless base station sends a voice output request message and the wireless terminal for mobile unit receives this message, whereby a voice information output from the wireless base station is allowed, so that a user of the wireless terminal for mobile unit can avoid a state of danger by the voice information from the wireless base station according to the circumstances.

Also, according to the fifth aspect of the invention, when only the information output from the wireless terminal for mobile unit to the wireless base station has been allowed in response to the fact that the operating means has been operated, in case that the wireless base station must send image information to the wireless terminal for mobile unit according to the present circumstances of the side of the wireless terminal for mobile unit obtained by an information output from the wireless terminal for mobile unit, the wireless base station sends an image output request message and the wireless terminal for mobile unit receives this message, and an image information output from the wireless base station is allowed, so that a user of the wireless terminal for mobile unit can avoid a state of danger by the image information from the wireless base station according to the circumstances.

What is claimed is:

1. A wireless terminal for mobile unit which is mounted in a mobile unit and conducts communication with a wireless base station through wireless, said wireless terminal comprising:

an operating section for starting the communication with the wireless base station; and a controller for performing a first operation in which the controller allows information to be output from the wireless terminal to the wireless base station and in which the controller prevents information from the wireless base station from being conveyed to a user of the wireless terminal in response to the operating section being operated by the user.

2. A wireless terminal for mobile unit as defined in claim 1, wherein said controller performs a second operation in which the controller allows information to be output to the wireless base station and in which the controller allows information from the wireless base station to be conveyed to the user in response to the operating section again being operated by the user while the first operation is performed.

3. A wireless terminal for mobile unit as defined in claim 1, wherein said controller performs a second operation in which the controller allows information to be output to the wireless base station and in which the controller allows information from the wireless base station to be conveyed to the user in response to the operating section again being operated by the user a predetermined period of time after the first operation has been initiated.

4. A wireless terminal for mobile unit as defined in claim 1, wherein said controller performs a second operation in which the controller allows information to be output to the wireless base station and in which the controller allows audio information from the wireless base station to be conveyed to the user in response to the wireless terminal receiving a voice output request message sent from the wireless base station when the first operation is performed.

5. A wireless terminal for mobile unit as defined in claim 1, wherein said controller performs a second operation in which the controller allows information to be output to the wireless base station and in which the controller allows image information from the wireless base station to be conveyed to the user in response to the wireless terminal receiving an image output request message sent from the wireless base station when the first operation is performed.

* * * * *